United States Patent
Kurtz, Jr.

(10) Patent No.: US 7,032,278 B2
(45) Date of Patent: Apr. 25, 2006

(54) HOOK FASTENER ENGAGING ZONES

(75) Inventor: Wallace L. Kurtz, Jr., Lunenburg, MA (US)

(73) Assignee: Velcro Industries B.V., (AN)

( * ) Notice: Subject to any disclaimer, the term of this patent is extended or adjusted under 35 U.S.C. 154(b) by 0 days.

(21) Appl. No.: 10/378,263

(22) Filed: Mar. 3, 2003

(65) Prior Publication Data

US 2004/0172792 A1    Sep. 9, 2004

(51) Int. Cl.
*A44B 21/00* (2006.01)

(52) U.S. Cl. .................. 24/442; 24/447; 604/390; 604/391

(58) Field of Classification Search .............. 24/442, 24/447, 449, 450, 306, 304; 428/100, 99, 428/120; 604/390
See application file for complete search history.

(56) References Cited

U.S. PATENT DOCUMENTS

| | | | | |
|---|---|---|---|---|
| 3,063,749 A | * | 11/1962 | Struble et al. ............... | 297/220 |
| 3,703,424 A | | 11/1972 | Charnock et al. ............ | 156/272 |
| 4,340,976 A | | 7/1982 | Wright ........................... | 2/338 |
| 4,568,342 A | | 2/1986 | Davis ......................... | 604/391 |
| 5,176,670 A | * | 1/1993 | Roessler et al. ............. | 604/391 |
| 5,190,799 A | * | 3/1993 | Ellingson, III ............... | 428/99 |
| 5,203,053 A | * | 4/1993 | Rudd ........................... | 24/306 |
| 5,259,905 A | | 11/1993 | Gilcreast ..................... | 156/250 |
| 5,482,589 A | | 1/1996 | Shin et al. ................... | 156/268 |
| 5,540,970 A | | 7/1996 | Banfield et al. ............. | 428/100 |
| 5,554,239 A | | 9/1996 | Datta et al. .................... | 156/66 |
| 5,614,281 A | | 3/1997 | Jackson et al. ............. | 428/100 |
| 5,731,056 A | * | 3/1998 | Butler, III .................... | 428/100 |
| 5,736,217 A | | 4/1998 | Banfield et al. ............. | 428/100 |
| 5,766,385 A | | 6/1998 | Pollard et al. .............. | 156/251 |
| 5,766,723 A | * | 6/1998 | Oborny et al. .............. | 428/100 |
| 5,786,061 A | | 7/1998 | Banfield ...................... | 428/100 |
| 5,797,896 A | | 8/1998 | Schmitz ...................... | 604/391 |
| 5,846,262 A | * | 12/1998 | Sayama et al. ............. | 604/391 |
| 5,858,515 A | | 1/1999 | Stokes et al. ............... | 428/195 |
| 5,919,540 A | * | 7/1999 | Bailey .......................... | 428/99 |
| 5,922,436 A | | 7/1999 | Banfield et al. ............. | 428/100 |
| 5,953,797 A | * | 9/1999 | Provost et al. ................ | 24/452 |
| 5,985,407 A | * | 11/1999 | Murasaki ..................... | 428/100 |
| 6,224,955 B1 | * | 5/2001 | Gorski ......................... | 428/99 |
| 6,730,069 B1 | * | 5/2004 | Tanzer et al. ................. | 24/442 |

FOREIGN PATENT DOCUMENTS

WO    WO 00/50229    8/2000

* cited by examiner

*Primary Examiner*—Jack W. Lavinder
(74) *Attorney, Agent, or Firm*—Fish & Richardson P.C.

(57) ABSTRACT

A method for manufacturing a fastener includes forming a preform sheet having a sheet-form base and an array of hook-shaped fastener elements extending from a broad side of the base, and securing a cover sheet with an aperture across the array of fastener elements, with fastener elements exposed for engagement in an engaging zone corresponding to the aperture of the cover sheet, and the engaging zone surrounded by a contiguous covered preform region. A fastener product includes a preform having a sheet-form base and an array of fastener elements extending from a broad side of the base, and a cover with and aperture secured across the array of fastener elements, the cover defining an aperture there through, with fastener elements exposed for engagement in an engaging zone corresponding to the aperture of the cover, and the engaging zone being surrounded by a contiguous covered preform region.

64 Claims, 15 Drawing Sheets

HOOK FASTENER ENGAGING ZONES

TECHNICAL FIELD

The present invention relates to fasteners having fields of hook-shaped fastener elements, and methods of making such fasteners.

BACKGROUND OF THE INVENTION

Fasteners exist which present fields of hook-shaped fastener elements for engagement, for example, with fibers or loops of a mating fastener. The hook-shaped fastener elements can be part of a fastener product preform which includes a sheet-form base with fastener elements extending from a broad side of the sheet-form base.

The sheet form base of such fasteners can present a sharp edge, and the fastening elements can be rough to the touch. Improvements to the hand of such fasteners are desired, for use against skin or in other products in which smooth surfaces are preferable.

SUMMARY

According to one aspect of the invention, a method of manufacturing a fastener includes forming a fastener product preform sheet having a sheet-form base and an array of hook-shaped fastener elements extending from a broad side of the base, and securing a cover sheet across the array of fastener elements so that fastener elements are exposed for engagement in an engaging zone corresponding to an aperture of the cover sheet, and so that a contiguous covered preform region surrounds the engaging zone. Such a method can produce a fastener that can mate with a complementary fastener via the hooks in the engaging zone, yet which also can be made to have a smooth hand in the covered preform region for the comfort of the user, which is especially advantageous in instances when the fastener is used in conjunction with a garment such as a diaper.

In some methods, securing includes covering fastener elements with the cover sheet in the covered preform region. In some such cases, securing includes releasably engaging the cover sheet with the fastener elements. In some of those cases, the cover sheet has engageable fibers that engage the fastener elements. In some others of those cases, the cover sheet has non-woven loop material that engage the fastener elements.

In some cases in which securing includes covering fastener elements with the cover sheet, the cover sheet is a resin sheet. In some such cases, securing also includes ultrasonically welding the resin sheet to the sheet-form base. In some other such cases, securing includes applying heat and pressure to weld the resin sheet to the sheet form base. In some other such cases, securing includes attaching the resin sheet to the sheet form base using adhesive material. In some other such cases, securing includes deforming and shortening the fastener elements in the covered preform region. And in some other such cases, securing includes permitting fastener elements within the engaging zone to protrude into the aperture. In some of those cases, securing includes permitting fastener elements within the engaging zone to protrude through the aperture.

In some methods, forming the fastener product preform includes molding the sheet-form base as a continuous strip. In some such cases, molding the sheet form base includes molding stems of the fastener elements integrally with the sheet form base. In some of those cases, the fastener elements include engageable heads formed on each stem. And in other such cases, forming the fastener product preform includes molding hook-shaped fastener elements integrally with the sheet-form base.

In some methods, the fastener elements comprise stems woven into the sheet-form base. And in some methods, the engaging zone is more engageable against a mating loop product than is the covering sheet.

Some methods include securing a backing sheet to a broad side of the preform sheet opposite that broad side from which the fastener elements extend. In some such cases, the method further includes securing the backing sheet to the cover sheet. Additionally, in some such cases the backing sheet comprises a resin sheet.

Some methods include passing the cover sheet through a cutting means to form the aperture.

Some methods include cutting a pattern into the preform sheet and removing an extraneous region from the preform sheet according to the pattern. In some cases, removal of the extraneous region leaves behind a closed pattern perforation in the preform sheet. In some such cases, cutting a pattern into the preform sheet includes feeding the preform sheet through a cutting means and cutting the pattern with the cutting means. The cutting means is preferably stationary in some of those cases. In some such cases the extraneous region is a longitudinally continuous strip, and in some of those cases, the cutting means can be one of a laser cutter, a die cutter, and a cutting blade. In some of the cases in which the preform sheet is fed through a cutting means and the pattern is cut with the cutting means, removal of the extraneous region leaves behind a closed pattern perforation in the preform sheet.

Some methods include securing a cover sheet having multiple apertures across the array of fastener elements, so that fastener elements are exposed for engagement in engaging zones corresponding to the apertures of the cover, and so that the engaging zones are separated by the contiguous preform region.

And some methods include covers in which the apertures have a lateral extent of less than about 0.625 inch.

According to another aspect of the invention, a fastener product includes a preform having a sheet-form base and an array of fastener elements extending from one broad side of the base, and a cover secured across the array of fastener elements. The fastener elements are exposed for engagement in an engaging zone corresponding to an aperture through the cover, and the engaging zone is surrounded by a contiguous covered preform region.

In some embodiments, exposed fastener elements in the engaging zone protrude into the aperture of the cover. In some such cases, exposed fastener elements in the engaging zone protrude through the aperture of the cover.

In some embodiments, exposed fastener elements in the engaging zone are below the cover.

In some embodiments, the apertures have a lateral extent of less than about 0.625 inch.

In some embodiments, the aperture is sized to prevent the tip of an adult human finger from touching the fastener elements in the engaging zone when the fingertip is placed lightly against the cover at the aperture.

In some embodiments, the cover is stretchable. In some such cases, the fastener product further includes a stretchable substrate upon which the preform is mounted. And of those cases, some include two preforms mounted to the stretchable substrate. In some such cases, the two preforms are attached. In some cases in which the preforms are attached, they are separably attached. In some cases in which the preforms are separably attached, they are separably attached along a fragile parting line. And in some cases in which the preforms are separably attached, they are separably attached along a breakable extension interposed between the sheet-form bases of the preforms.

In some embodiments, the sheet-form base of the preform is molded. In some such cases, the fastener elements comprise stems integrally molded with the sheet-form base. In some of those cases, the fastener elements have engageable heads formed on each stem. In some such cases the fastener elements are hook-shaped and are integrally molded with the sheet-form base. In some such cases, the first engaging zone is more engageable against a mating loop product than is the covering. In some such cases, the fastener elements comprise stems woven into the sheet-form base. In some such cases, an edge of the cover extends beyond the sheet-form base of the preform. In some such cases, an edge of the cover extends to an edge of the sheet-form base. And in some such cases, an edge of the sheet form base extends beyond the cover.

One aspect of the invention features a method of manufacturing a fastener product, including forming a plurality of apertures with corresponding flaps in a preform sheet, folding back the flaps to expose the apertures and applying molten resin to the preform sheet with apertures. The molten resin bonds to the preform sheet and at least partially overlaps the apertures. On the exposed resin surface, an array of discrete fastener elements with stems are formed so that they are integrally molded with and extend from the resin surface. Selected regions of fastener elements are covered by folding the flaps over the fastener elements in the apertures.

In some implementations, the preform sheet is a thermoplastic, while in other implementations, the preform sheet is a thermoplastic elastomer. In still other implementations, the preform sheet is a nonwoven fabric.

In some implementations, the steps of forming the apertures, folding back the flaps, applying molten resin, forming an array of discrete fastener elements and folding the flaps over the fastener elements are performed continuously.

In some implementations, flaps are secured over the fastener elements with the application of heat, while in other implementations, flaps are secured using adhesive. In still other implementations, flaps are secured using ultrasonic welding.

In some implementations, fastener elements are formed by molding the fastener elements integrally with the resin surface. In other implementations, discrete stems are molded and then the distal ends of the stems are deformed to form engageable heads on the stems.

In some implementations, the resin surface is longitudinally continuous in the machine direction.

In some implementations, the method further includes releasably securing the flaps over the fastener elements.

Other features and advantages of the invention will be apparent from the drawings, the following description and the claims.

DETAILED DESCRIPTION

Figure 1:
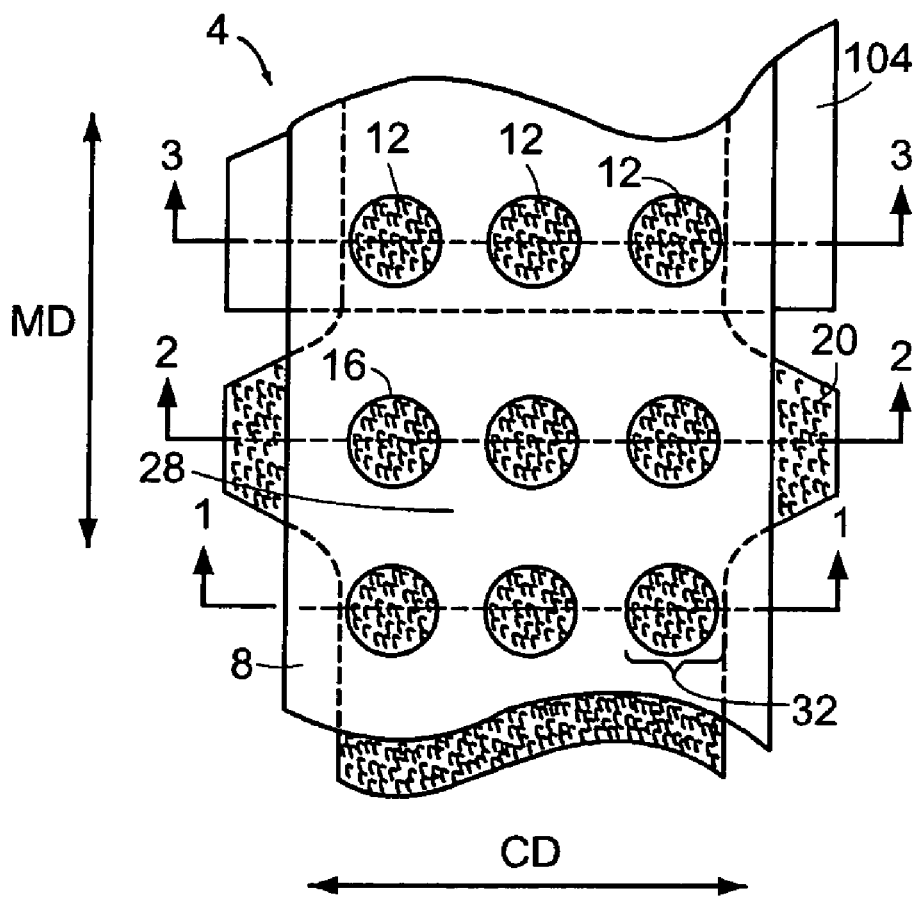
FIG. 1 is an omnibus plan view of a fastener product.
Figure 2:
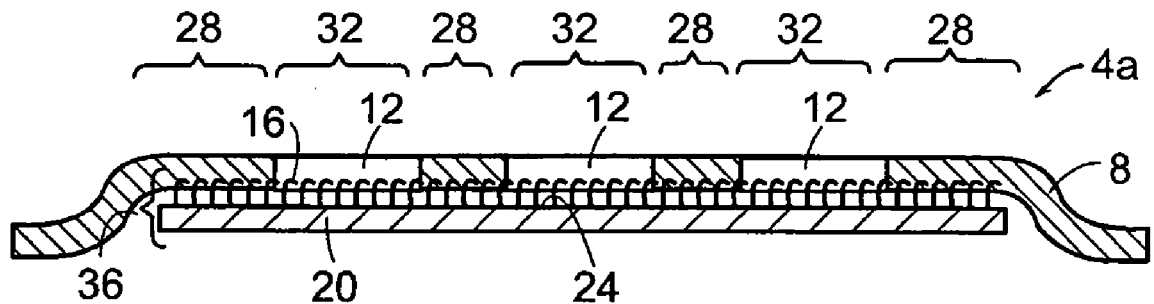
FIGS. 2 and 3 are cross-sectional views taken along line 1—1 of FIG. 1, and illustrate embodiments of the fastener product.
Figure 3:
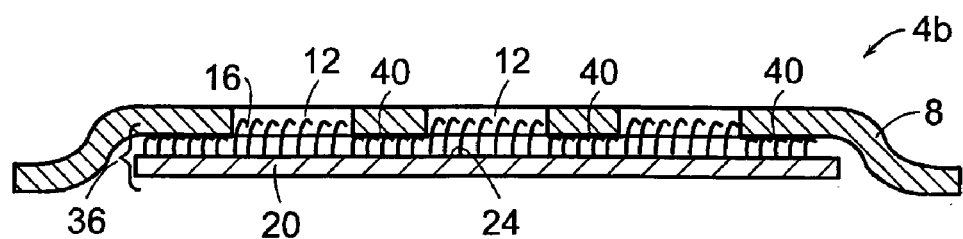
Figure 4:
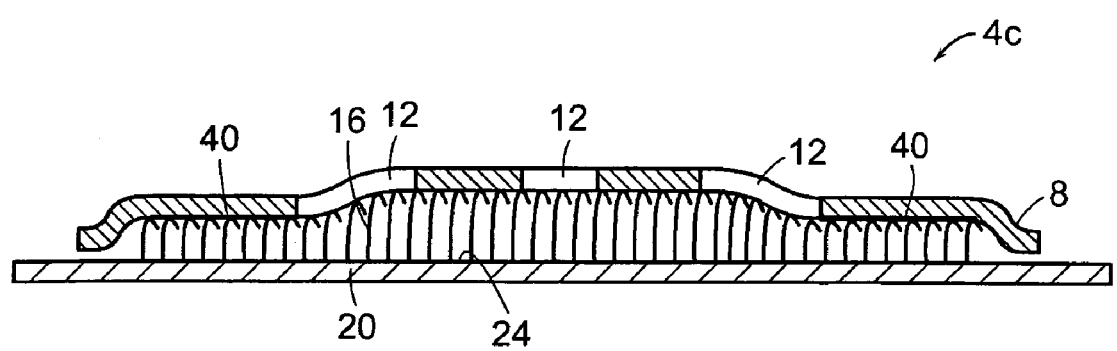
FIGS. 4 and 5 are cross-sectional views taken along line 2—2 of FIG. 1, and illustrate embodiments of the fastener product.
Figure 5:
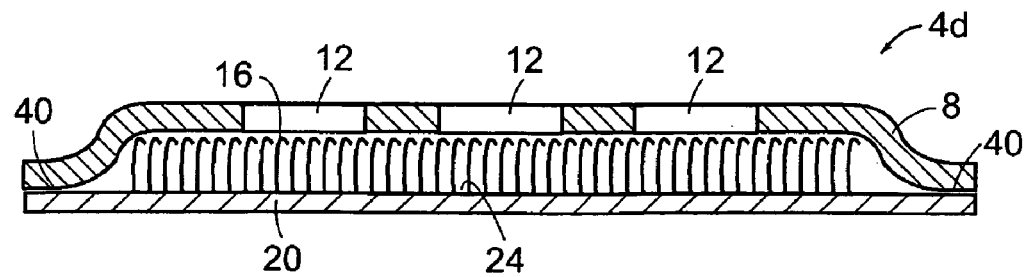

Referring to FIGS. 1 and 2, fastener 4 includes sheet-form base 20, which has a broad side 24 from which hook-shaped fastener elements 16 extend, and covering strip 8, which is situated above and mostly covers sheet-form base 20, and which has apertures 12 through which hook-shaped fastener elements 16 are exposed. Section 1—1 is drawn through a region of fastener 4 in which sheet-form base 20 is narrower than covering strip 8, i.e., where covering strip 8 extends across and beyond the edges of sheet-form base 20. FIGS. 2, 3, 6 and 7 are cross-sectional views of fastener 4 that correspond to section 1—1 but that illustrate differing embodiments 4a, 4b, 4e, and 4f of fastener 4, as will also be discussed below. Section 2—2 is drawn through a region of fastener 4 in which sheet-form base 20 is wider than the covering strip 8 and extends out from under it. FIGS. 4 and 5 are cross-sectional views of fastener 4 that correspond to section 2—2, but that illustrate differing embodiments 4c and 4d of fastener 4, as will be discussed below. Section 3—3 is drawn through a region of fastener 4 in which sheet-form base 20 is narrower than covering strip 8, and in which a backing strip 104, wider than sheet form base 20 and attached to the back of same, is included. FIG. 8 is a cross-sectional view of fastener 4 the corresponds to section 3—3 and illustrates embodiment 4g of fastener 4.

Where sheet-form base 20 is situated below covering strip 8 (this would include, for example, the portions of sheet-form base 20 in embodiments 4c and 4d that do not extend out from under covering strip 8, and all portions of sheet-form base 20 in embodiments 4a, 4b, 4e and 4f), its broad side 24 is divided between contiguous covered regions 28, and uncovered regions corresponding to engaging zones 32 of fastener 4. The boundaries between the contiguous covered regions 28 of the sheet-form base and the engaging zones 32 of the overall fastener 4 are defined by the apertures 12 of the covering strip 8. In FIG. 2, the fastener elements 16 in the covered region 28 are shown directly engaged or enmeshed with the covering strip 8, securing the covering strip 8 to the sheet-form base 20. Variations of covering strip 8 that permit releasable engagement with the hook-shaped fasteners 16 include blown or spun-bonded resin sheets having engageable fibers. By contrast, the fastener elements 16 in the engaging zones 32 are exposed for releasable engagement with one or more separate complementary fasteners (not shown), such as a strip comprising non-woven loop material on one broad side, which can be pressed against covering strip 8 down onto or into one or more of the apertures 12.

Although hook-shaped fastener elements are illustrated, it will be understood that fastener elements of other shapes, such as mushroom-shaped or palm-tree shaped fastener elements can be employed. The fastener elements should have an engageable head that overhangs the base for engaging loops or other female fastener elements. Molded fastener elements are preferred for many applications, but woven fastener elements may also be employed. Hook-shaped fastener elements 16 can be formed from filaments woven into and through base 20 to form a fastener product preform strip 36. Another method of fabricating preform strip 36 is molding fastener elements 16 integrally with base 20, for example in a manner similar to that shown and described in U.S. Pat. No. 4,775,310 to Fischer, incorporated by reference herein in its entirety. J-shaped hooks may be molded to extend in the machine direction (MD) as taught by Fischer, or to extend in the cross-machine direction (CD), such as by molding the fastener elements in CD-facing cavities formed by the plating methods disclosed in U.S. Pat. No. 6,258,311, the contents of which are hereby incorporated by reference herein in their entirety.

Referring to FIGS. 1 and 3–5, one or more bonds 40 can optionally secure the covering strip 8 to the preform strip 36. The bonds 40 can be formed by a combination of pressure and temperature, for example, by elevating the temperature of the preform strip 36 to soften the fastener elements 16 so that they are tacky, then passing the two strips together through a high-pressure nip. The bonds 40 can also be formed using adhesives and ultrasonic welding. Fastener elements 16 in the covered region 28 may desirably be shortened and deformed during the formation of bonds 40, while it is preferable that, at the same time, fastener elements 16 in the engaging zones 32 be left intact. Steps are therefore preferably taken to prevent the fastener elements 16 in the engaging zones 32 from being deformed during the process of forming bonds 40, and those steps can include forming a pattern or a channel in the rollers of the bonding nip to avoid pressing on the fastener elements 16 to be protected. As discussed above, FIG. 3 illustrates embodiment 4b of fastener 4, in which covering strip 8 is wider than sheet-form base 20 at section 1—1, and FIGS. 4 and 5 respectively illustrate embodiments 4c and 4d, in which covering strip is narrower than sheet-form base 20 at section 2—2.

Figure 6:
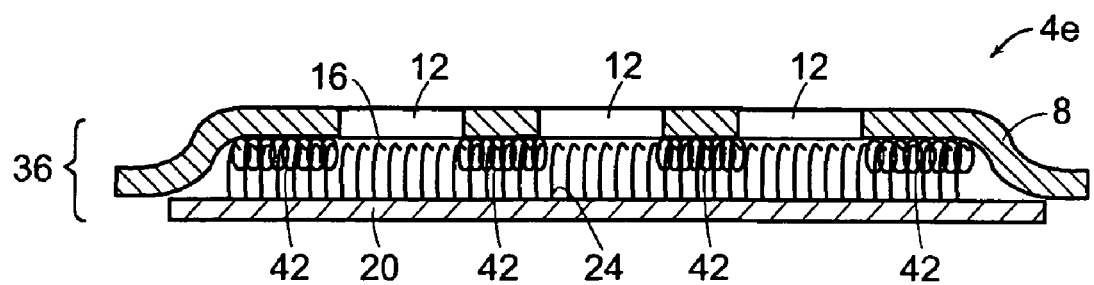
FIGS. 6 and 7 are cross-sectional views taken along line 1—1 of FIG. 1, and illustrate embodiments of the fastener product.

Referring to FIGS. 1 and 6, embodiment 4e of fastener 4 is illustrated. Covering strip 8, shown wider than sheet-form base at section 1—1, can have a non-woven loop material 42 on one broad side that is pressed against the fastener elements 16 in the covered region 28 so that they engage with the loop material 42, securing the covering strip 8 to the preform strip 36.

Figure 7:
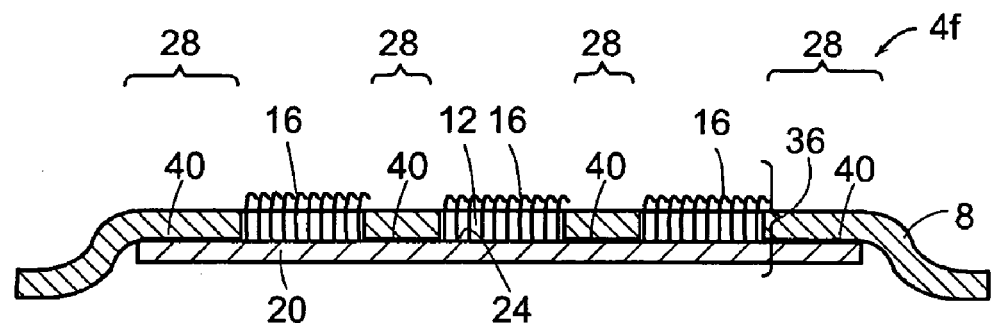
Figure 8:
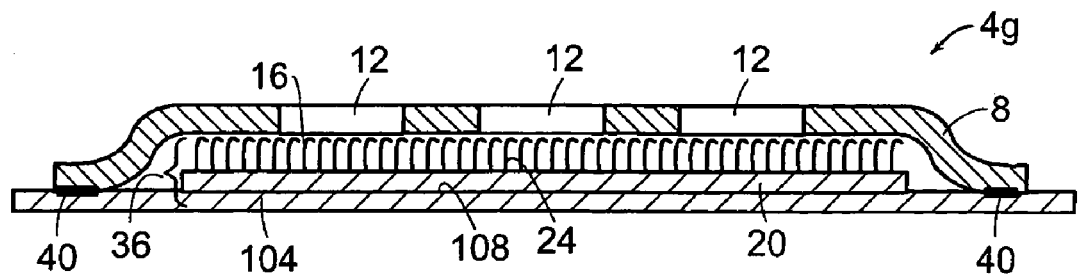
FIG. 8 is a cross-sectional view taken along line 3—3 of FIG. 1, and illustrates an embodiment of the fastener product.

Referring to FIGS. 1 and 7, embodiment 4f of fastener 4 is illustrated. Covering strip 8, shown wider than sheet form base at section 1—1, is attached to preform strip 36 at bonds 40 in covered regions 28 of broad side 24 where fastener elements 16 do not appear. Covering strip 8 can be attached to preform strip 36 by ultrasonic bonding using a rotary die, and an anvil or horn or adhesives. Alternatively, the two components can be staked using an adhesive. If fastener elements 16 are located in covered regions 28 prior to attachment of covering strip 8, they can be removed prior to attachment or melted flat during attachment.

Figure 12:
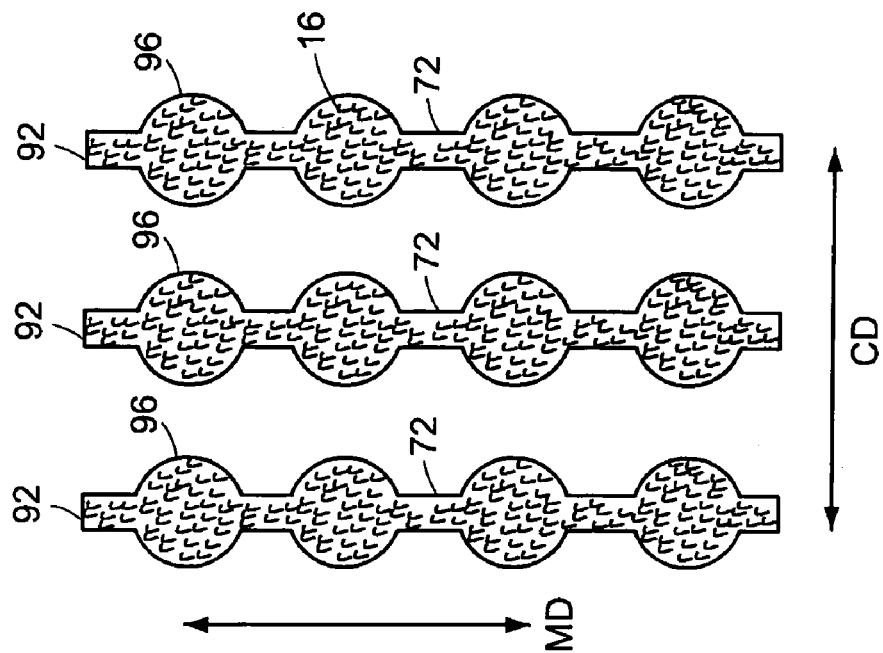
FIG. 12 is a plan view of strips of fastener product preform with extraneous regions removed.

Referring to FIGS. 1 and 8, embodiment 4g of fastener 4 is illustrated at section 3—3. Backing strip 104 is attached to a broad side 108 of the sheet-form base 20 opposite broad side 24 from which the fastener elements 16 extend. The covering strip 8 can be attached to the backing strip 104, for example at bonds 40 beyond the edges of the preform strip 36 as shown in FIG. 12. Woven, nonwoven, spun bonded laminates, neck bonded laminates, melt blown laminates and alike can be specified for covering strip 8 and backing strip 104 to shield a user's skin from the preform strip, and so the final product will have good "hand", i.e., a pleasantly soft texture.

Figure 10:
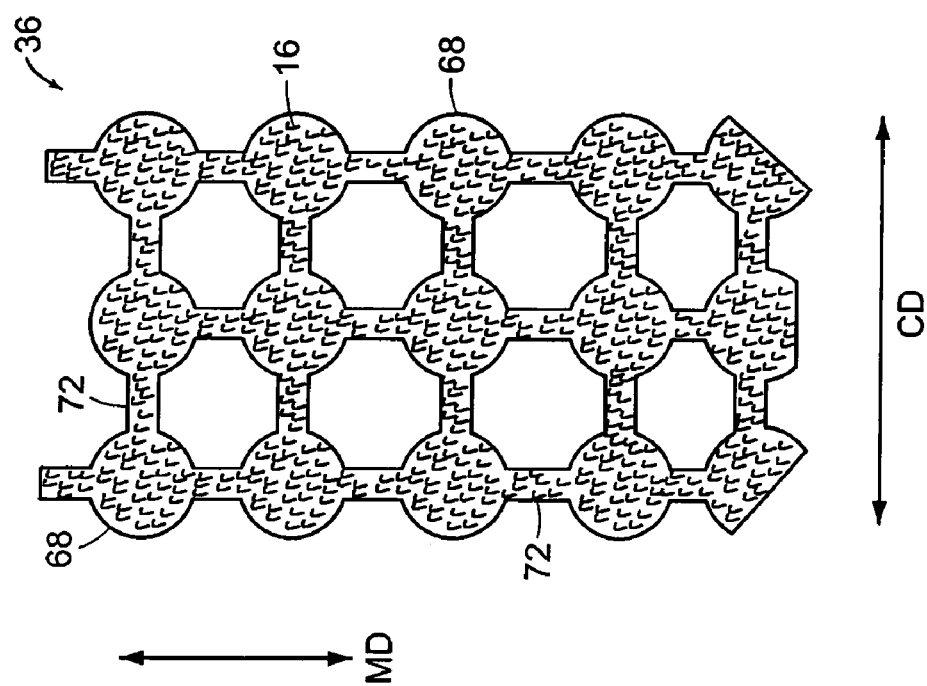
FIG. 10 is a plan view of a strip of fastener product preform with extraneous regions removed.
Figure 9:
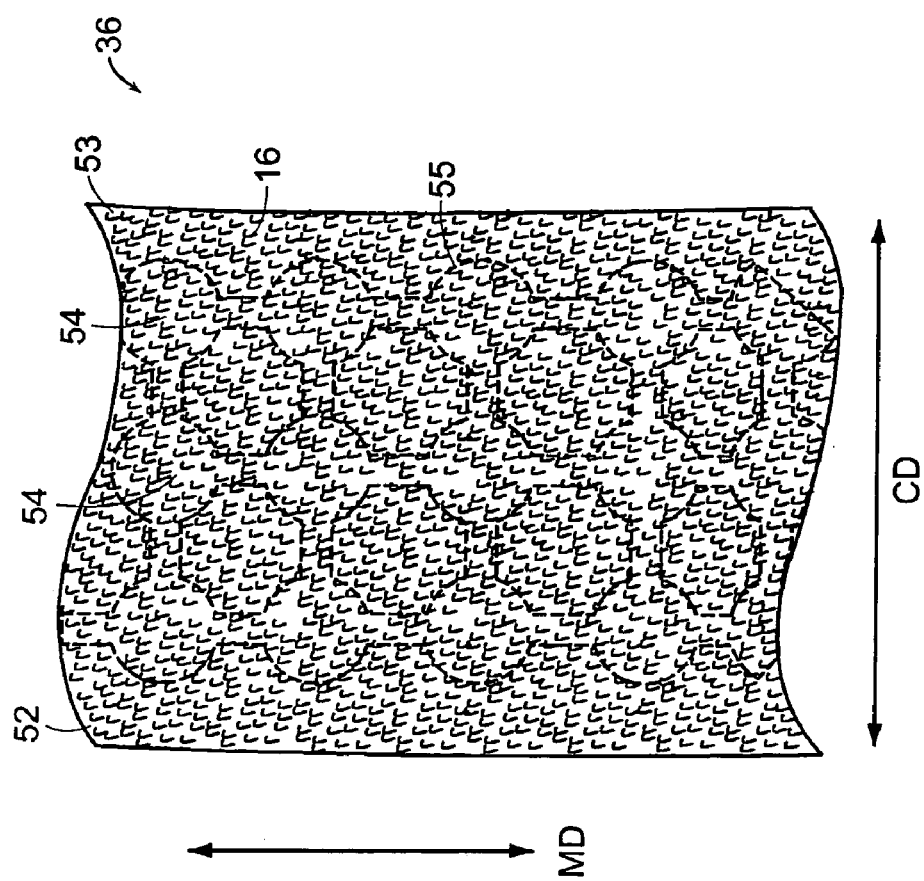
FIG. 9 is a plan view of a strip of fastener product preform, with extraneous regions marked for removal.

Referring to FIGS. 9 and 10, one or more extraneous regions, e.g., regions 52, 53 and 54, of the preform strip 36 can be removed according to a predefined pattern 55 prior to securing it to the covering strip 8 to form the fastener 4. Preform strip 36 can be fed in the machine direction into a die cutter for this purpose, or a laser or blade cutter. The regions removed are extraneous because if not removed they would otherwise be covered by the covering strip in the covered region of the finished product, outside of the engaging zones, and/or are not needed for the purpose of providing an engaging surface with the covering strip (e.g., the covering strip may not have loose fibers or loops intended to engage with the hooks). Pre-cutting the preform strip 36 in this manner, or in a manner similar to this, can make the assembled fastener 4 generally lighter, thinner, more flexible, and less costly since the extraneous regions 52, 53, and 54 can be recovered and recycled. Cutting away and removing extraneous regions 54 according to closed patterns, and extraneous side regions 52 and 53 according to longitudinally extending patterns as shown in FIG. 9, can result in a single-piece preform strip 36 as shown in FIG. 10 having generally circular shaped patches 68 with extensions 72 of the same material extending in the machine and cross-machine direction between them. Other shaped patches may be used when desired.

Figure 11:
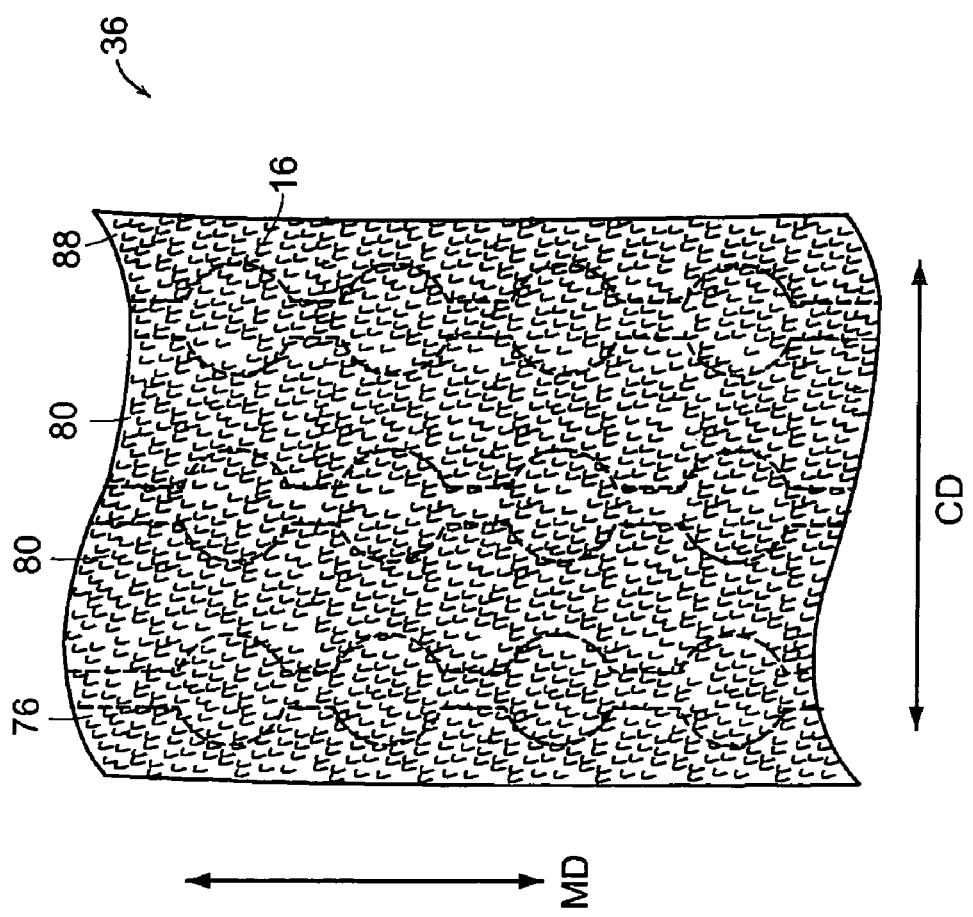
FIG. 11 is a plan view of a strip of fastener product preform with extraneous regions marked for removal.

As shown in FIGS. 11 and 12, cutting away and removing only longitudinally extending regions, e.g. strips 76, 80, and 88 from preform strip 36 will result in separate preform strips 92 containing circular patches 96 (similar to the circular patches 68 of FIGS. 8 and 9) and extensions 72 from the original one-piece preform 36, which strips can then be attached to the cover to form many engaging zones. The circular shaped patches 96 are preferably slightly larger than the apertures with which they are to be paired, to prevent gaps in the fastener elements in the engaging zone. Also, an irregular pattern in the final preform strip can be provided if desired by altering the cutting pattern of preform 36 and arranging the resulting preform or preforms as necessary.

Figure 13:
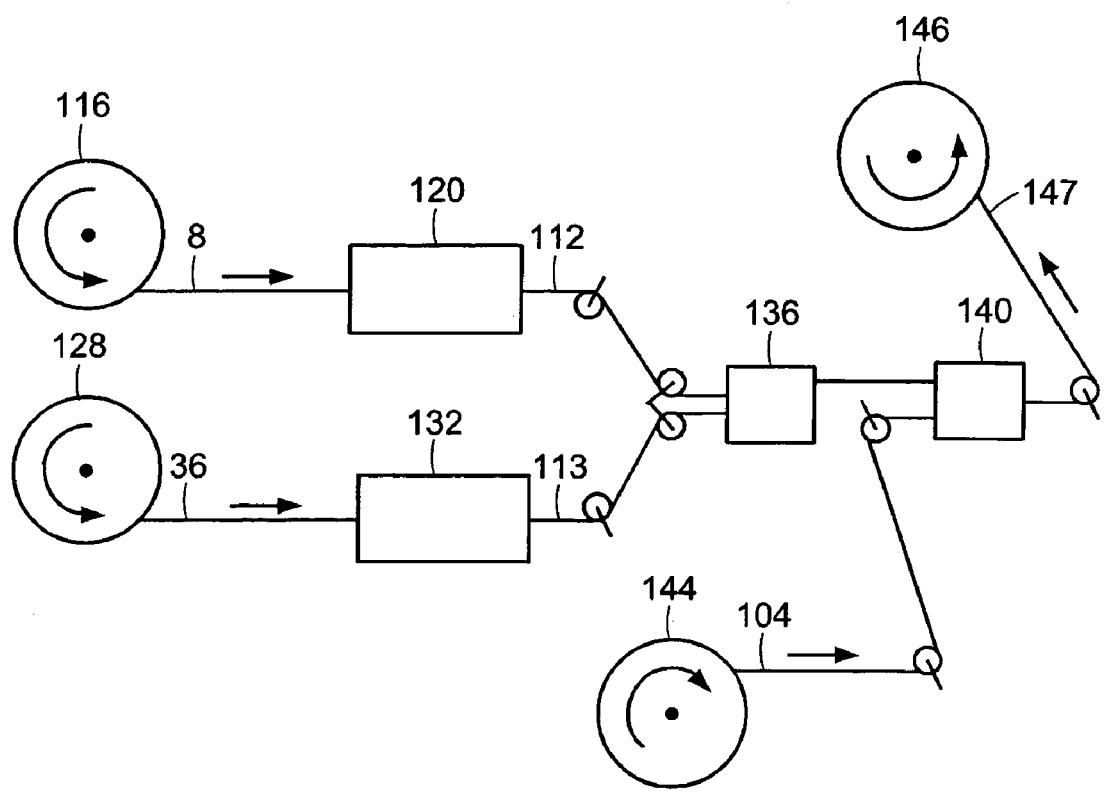
FIG. 13 is a side elevational schematic view illustrating apparatus for manufacturing a fastener in strip form.

Referring to FIG. 13, a continuous covering strip 8 is dispensed from reel 116 and fed toward a first cutter 120, where apertures are cut in the covering strip 8, forming 112. A continuous strip of fastener preform 36 is dispensed from reel 128 and fed toward a second cutter 132, where extraneous regions are cut from and removed from the fastener preform 36. The covering strip 112, with apertures cut, and the fastener preform, with extraneous regions removed 113, are then fed toward joining means 136, which can be an ultrasonic bonding machine, a machine that stakes the strips with adhesive, a machine that presses hooks of the preform into engagement with fibers of the covering strip, and/or a machine that stitches the strips together to form, for example, any of embodiments 4a–4f of fastener 4 illustrated in FIGS. 2–7. A second securing means 140 secures a backing strip 104, fed from reel 144, to the preform strip and/or the covering strip, and the result can be the same as or similar to embodiment 4g of fastener 4 illustrated in FIG. 8. A take-up reel 146 collects the finished fastener 147 in the form of a continuous strip. Other configurations of manufacturing apparatus are possible. For example, the securing means 140 can perform its function in the manufacturing line prior to securing means 136, or, for example, the take-up reel 146 can be eliminated and the finished fastener can be cut and divided into predetermined lengths which can then be stacked for storage or shipment.

Figure 14:
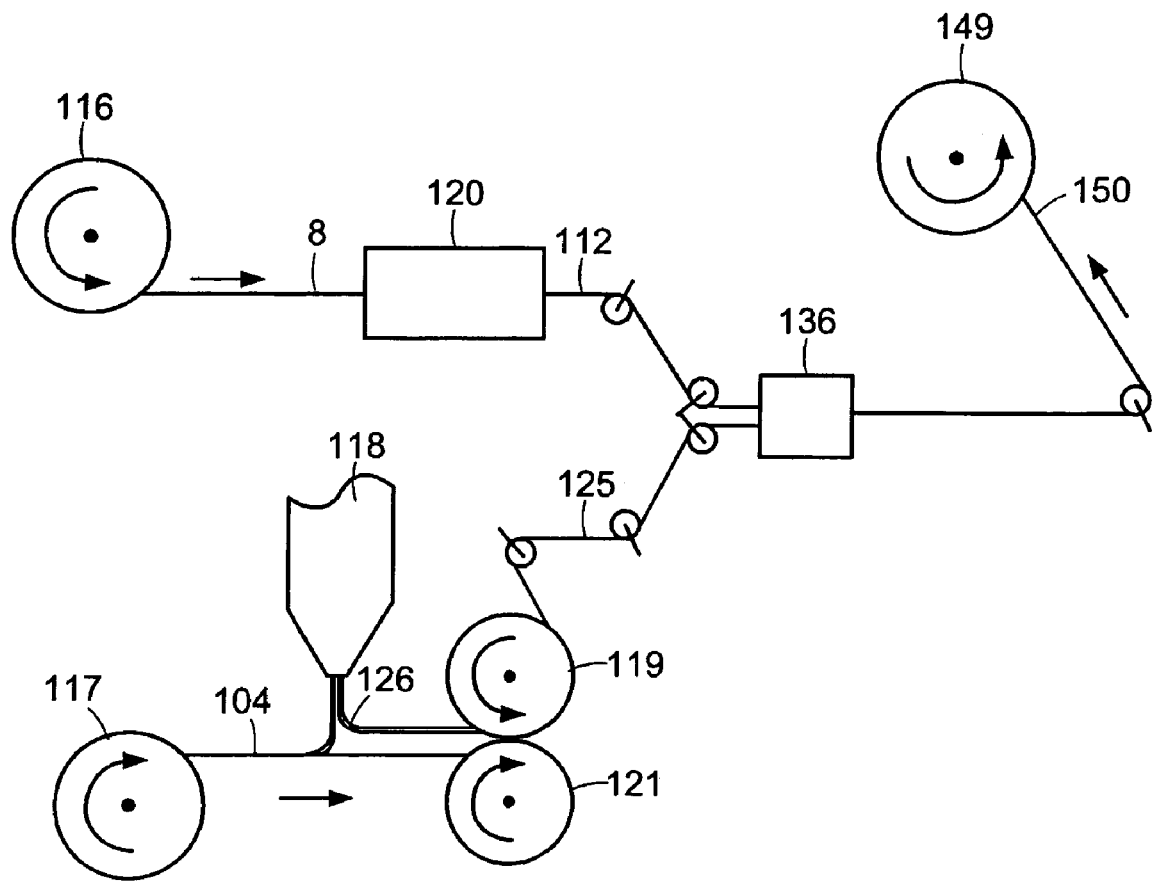
FIG. 14 is a side elevational schematic view illustrating apparatus for manufacturing a fastener in strip form.

Referring to FIG. 14, another alternative configuration of manufacturing apparatus is illustrated. A continuous covering strip 8 is dispensed from reel 116 and fed toward a cutter 120, where apertures are cut in the covering strip, forming 112. A backing strip 104 is dispensed from reel 117 and passed beneath the extruding head 118 of an extruder. Moldable plastic material 126 such as polypropylene, nylon, polyurethanes, polyolefins, polyethylene, polystyrene, polycarbonates, polyesters, polymethyl methacrylate and alike is dispensed from extruding head 118 and deposited on backing strip 104, and the combination is then passed between forming roller 119 and pressure roller 121 to produce continuous strip 125 which comprises the fastener preform 36 (i.e., sheet-form base 20 having hook-shaped fasteners 16 extending from a broad side 24) backed by backing strip 104, for example as those components are depicted in FIG. 8. The covering strip 112 and continuous strip 125 are then fed toward joining means 136, which can be an ultrasonic bonding machine, a machine that stakes the strips with adhesive, a machine that presses hooks of the preform into engagement with fibers of the covering strip, and/or a machine that stitches the strips together. A take-up reel 149 collects the finished fastener 150 (which can be the same as or similar to embodiment 4g of fastener 4 as depicted in FIG. 8) in the form of a continuous strip.

Figure 15:
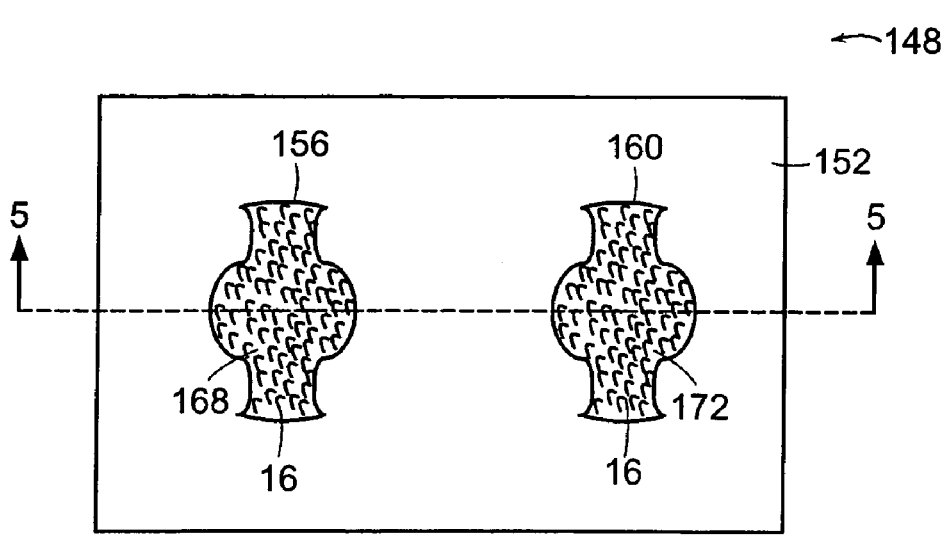
FIG. 15 is a plan view of a fastener product.
Figure 16:
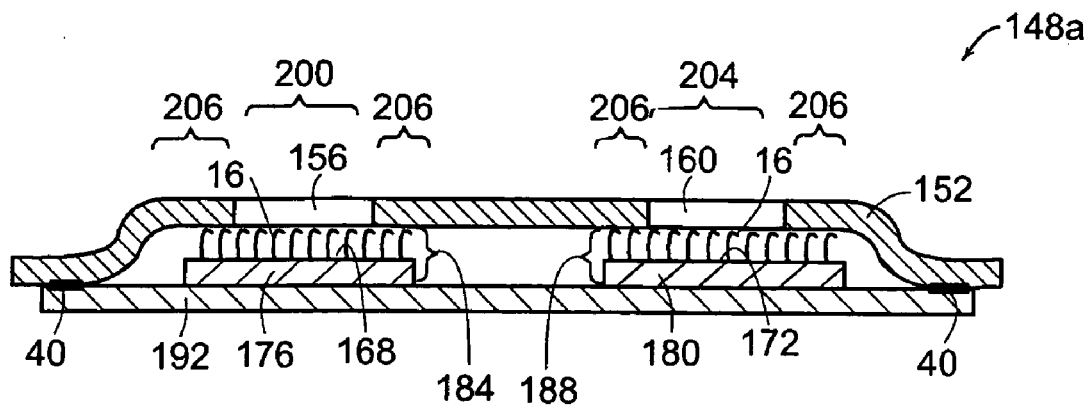
FIGS. 16–22 are cross-sectional views taken along line 5—5 of FIG. 15, and illustrate embodiments of the fastener products.
Figure 17:
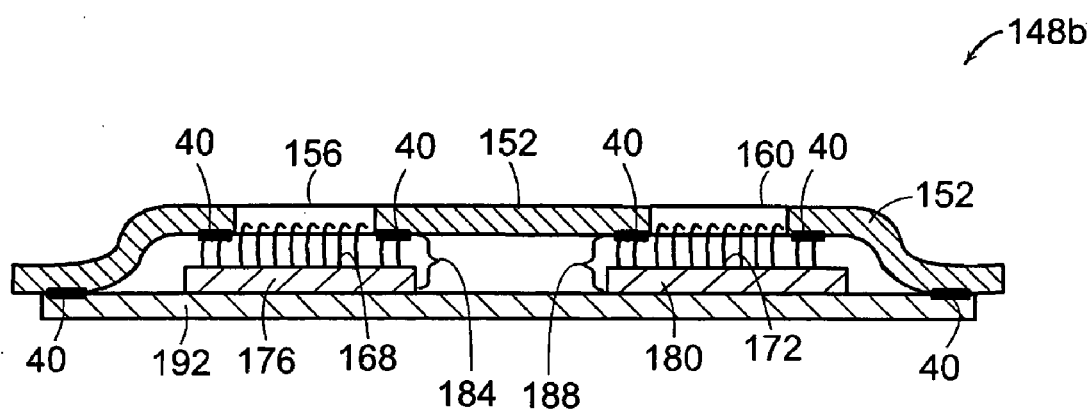

Referring to FIGS. 15-22, fastener 148 comprises a stretchable covering 152 with apertures 156 and 160 exposing hook-shaped fastener elements 16 extending from respective broad surfaces 168 and 172 of the sheet-form bases 176 and 180 of respective fastener product preforms 184 and 188, which preforms are either separate from each other, or separably attached to each other. The similar shape and size of apertures 156 and 160 as shown in FIG. 15 are only exemplary. The apertures can differ in size or shape, and more than two apertures can be incorporated into the fastener. Preforms 184 and 188 are each secured to a stretchable backing 192. Apertures 156 and 160, respectively positioned above preforms 184 and 188, respectively define two separate engaging zones 200 and 204, and the stretchable covering 152 combined with the positions of the preforms 184 and 188 define covered regions 206. Fastener elements 16 extending from each of the sheet-form bases 176 and 180 are engageable within respective engaging zones 200 and 204 by an external complementary fastener (not shown).

Figure 18:
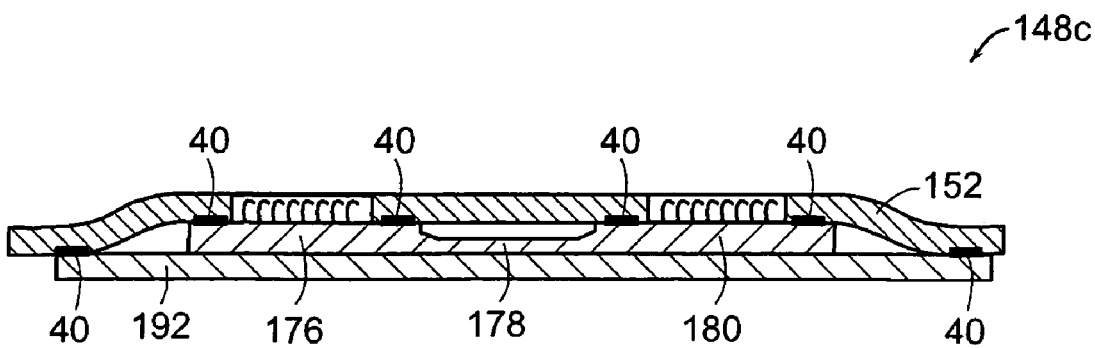
Figure 19:
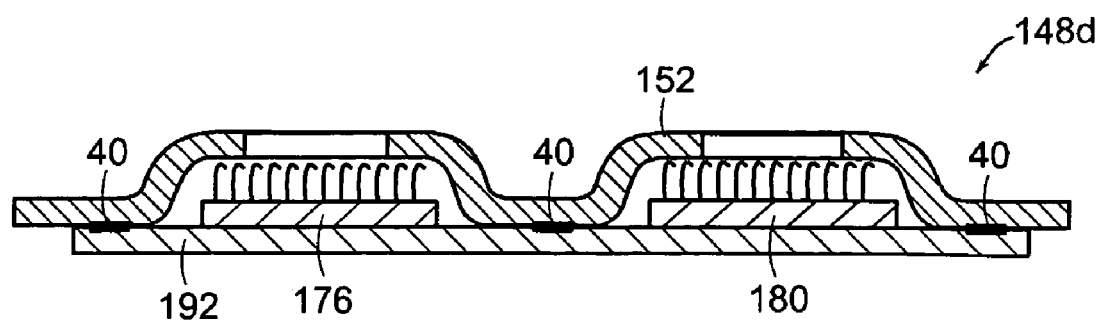
Figure 20:
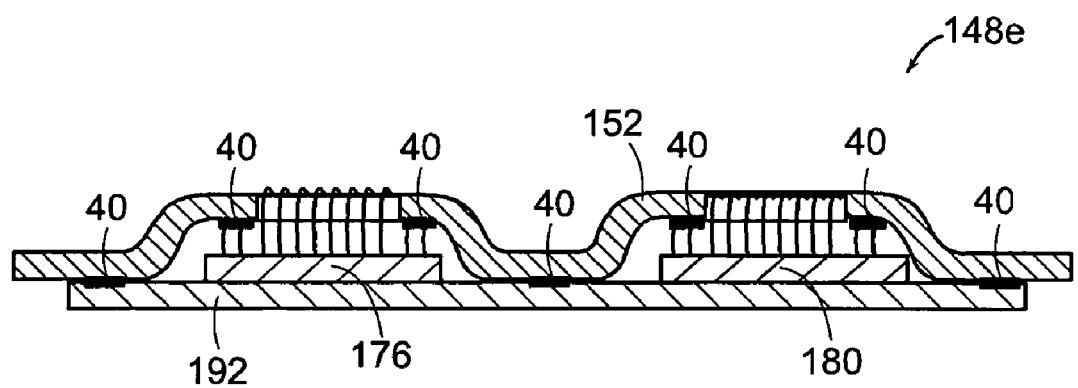
Figure 21:
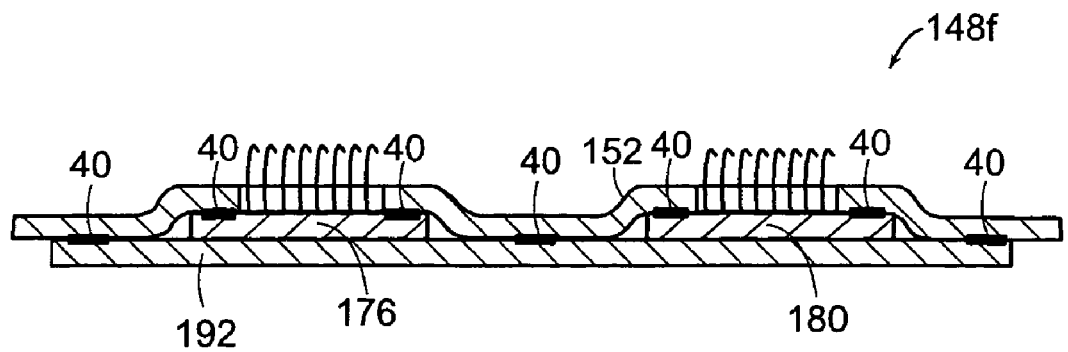
Figure 22:
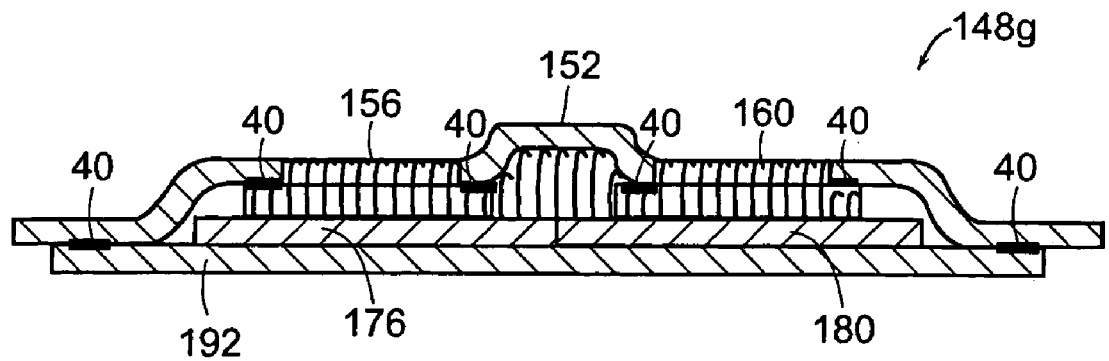

Fastener 148 of FIG. 15 can take the form of a variety of embodiments. For example, embodiments 148a–148g as illustrated, respectively, in FIGS. 16–22, all of which figures are cross-sectional views of fastener 148 in FIG. 15 along section 5—5. FIGS. 16–22 illustrate fasteners that are similar in that the stretchable covering 152 is bonded at bonds 40 to the stretchable backing 192 at the edges of the respective fastener, outboard of the preforms 184 and 188, for example with different methods of bonding as shown and described above with regard to FIGS. 3–5. FIGS. 17–18 and 20–22 illustrate fasteners that include bonding points on either side of the apertures 156 and 160. And FIGS. 19–21 illustrate fasteners that include bonding points between preforms 184 and 188. FIG. 18 shows the preforms 184 and 188 still connected by a 'bridge' or extension 178 that is easily breakable when the two engaging zones are pulled apart, and which can be very thin and molded integrally with the sheet-form bases 176 and 180. FIG. 22 illustrates preforms 184 and 188 that are separably attached to each other along a frangible parting line. All of the embodiments 148a–148g of fastener 148 in FIGS. 16–22 include fastener elements positioned for engagement within separate engaging zones that are preferably custom shaped and spaced according to the apertures in the covering, and all of the embodiments permit elastic stretching of the covering and backing strips in unison, which in turn permits the engaging zones to change their position relative to each other for special fastening purposes.

Figure 23:
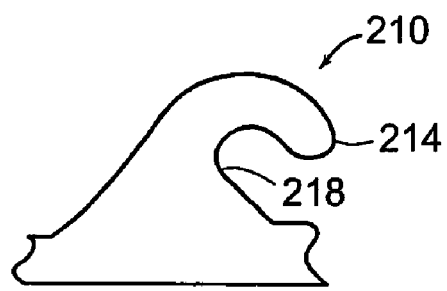
FIG. 23 is a side view of a molded hook of for fastener product.
Figure 24:
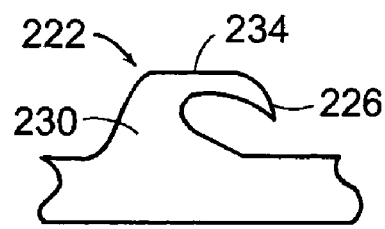
FIG. 24 is a side view of an aggressively-shaped molded hook for a fastener product.

Referring to FIGS. 23 and 24, a molded hook 210 for a fastener product has a rounded tip 214, a rounded profile and a gradually tapering crook 218, suitable for exposed hook-engaging zones. When an engaging zone includes a cover which allows the hooks to be enclosed within an aperture to the cover, preferably slightly below the surface of the cover, a more aggressively shaped hook 222 can be selected having, for example, a sharper tip 226, a sharply widening crook 230, and a flattened top 234 to add to a smooth texture when the hook is touched from above.

Figure 25:
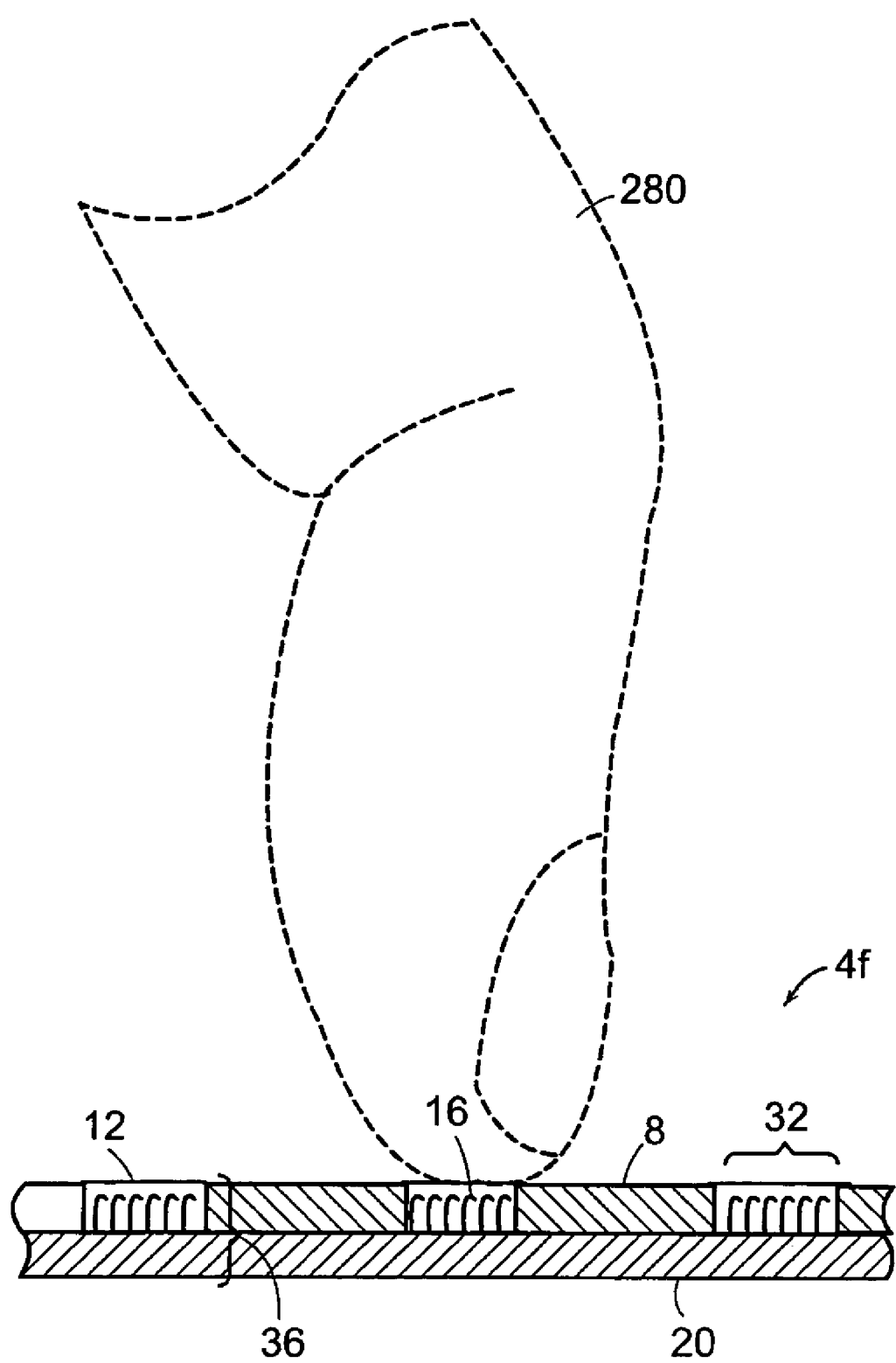
FIG. 25 is a cross-sectional view taken along line 1—1 of FIG. 1, illustrating an embodiment of the fastener product having small engaging zones as compared to the tip of an adult human finger.

Referring to FIG. 25, an embodiment 4f of a fastener 4 includes apertures 12 in the covering strip 8 and corresponding engaging zones 32 that are small enough in size such that when an adult human finger 280 is caused to slide with slight downward pressure along the cover and across an aperture, the tip of the finger will not touch the hooks 16 in the corresponding engaging zone 32. Because the hooks 16 will be largely imperceptible, the final product will feel very cloth like, i.e., it will have a smooth hand. This can be the case even if the hooks 16 chosen for use in the embodiment are more aggressive in shape (so chosen, for example, because a stronger fastener is desired—see FIG. 24 and description above). To mate with the hooks in the small engaging zones, a lofty loop product such as a woven or non-woven loop, or a similar loop currently used in the diaper industry or other industries, can be specified. The lofty loops can be continuous or fields of loop patches can be specified depending on the amount of engagement required. Applications where the present embodiment may be useful include those in which the level of fastening strength found in traditional systems (peel and shear) is not necessary, and those involving cloth like fasteners which may come in direct contact with the skin. Such cloth like fasteners can find use in certain applications to create friction (i.e., a low level of shear resistance) with little or no peel resistance. These systems can be used to keep the entire fastening system in place while reducing the load on the primary fastening systems. In one preferred embodiment, covering 8 is a non-woven material having a basis weight of about 0.25–5 ounces per square yard, and uncrushed loft of about 0.001–0.200 inch, and a maximum lateral aperture extent of about 0.625 inch, and overlays a molded preform 36 with J-shaped hooks 16 extending about 0.005–0.100 inch from the near surface of the base 20.

Figure 26:
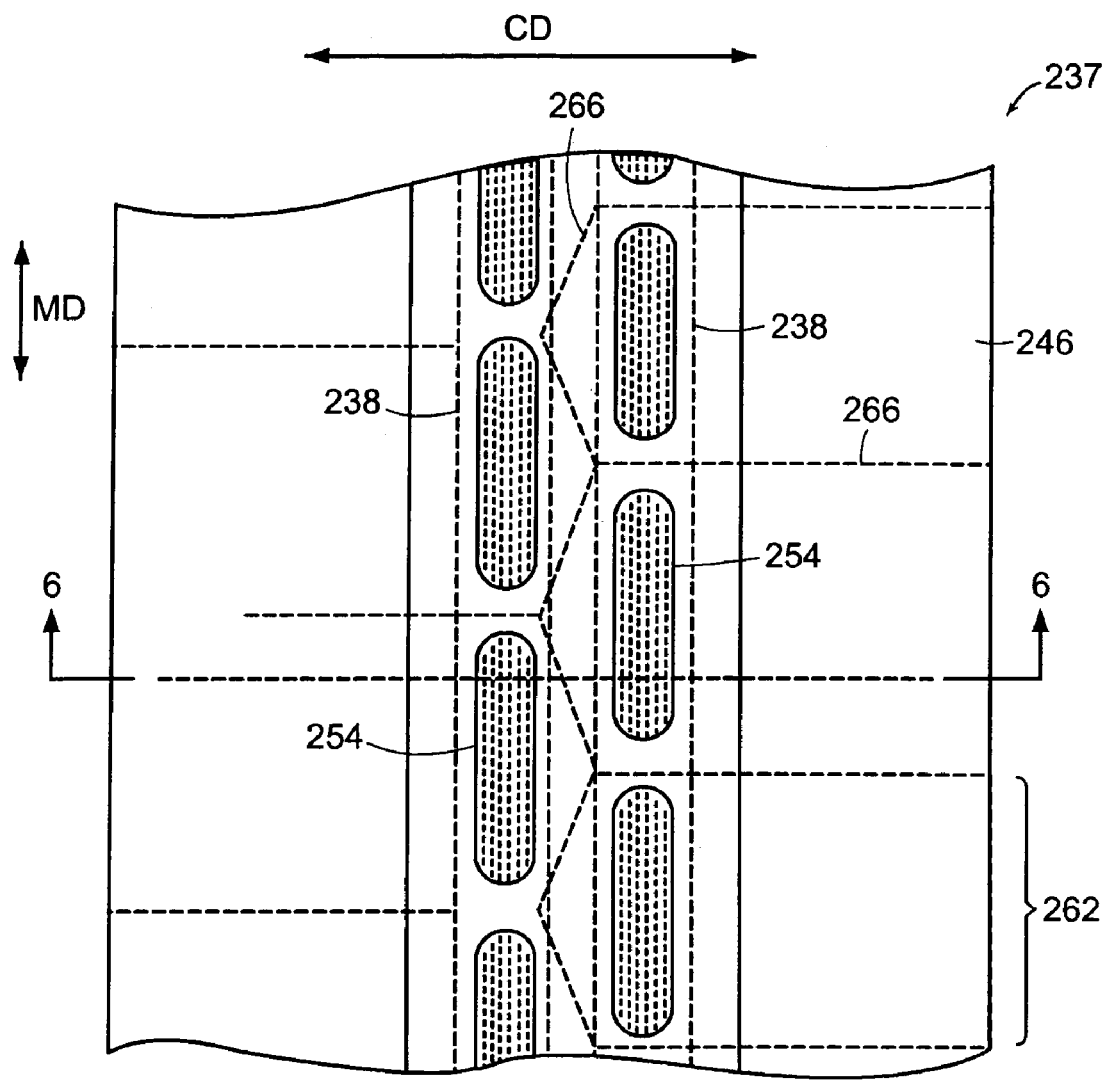
FIG. 26 is a plan view of a fastener product with pre-cut parting lines for formation of individual fastener tabs.
Figure 27:
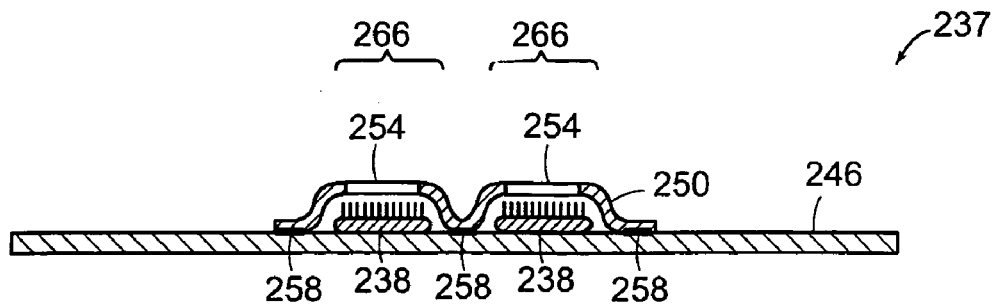
FIG. 27 is a cross-sectional view taken along line 6—6 of FIG. 26.
Figure 29:
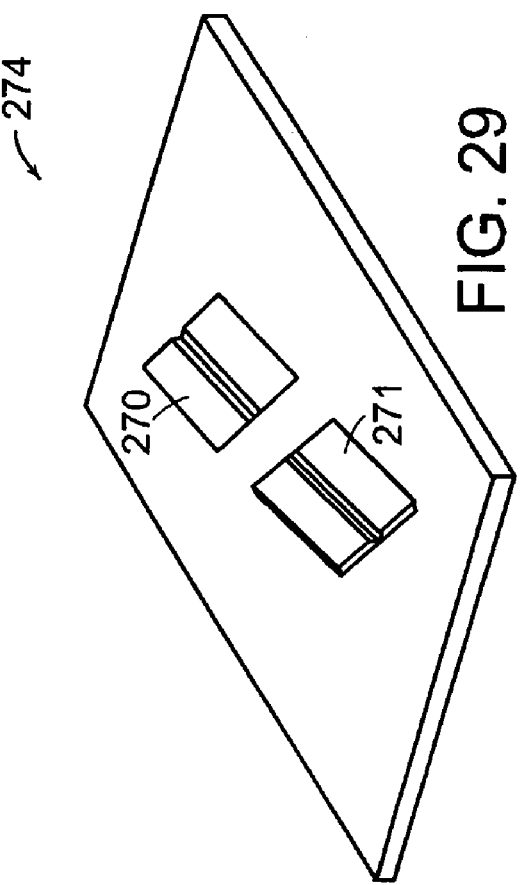
FIG. 29 is a perspective view of the preform sheet of FIG. 28 with a plurality of apertures and flaps formed thereon.
Figure 28:
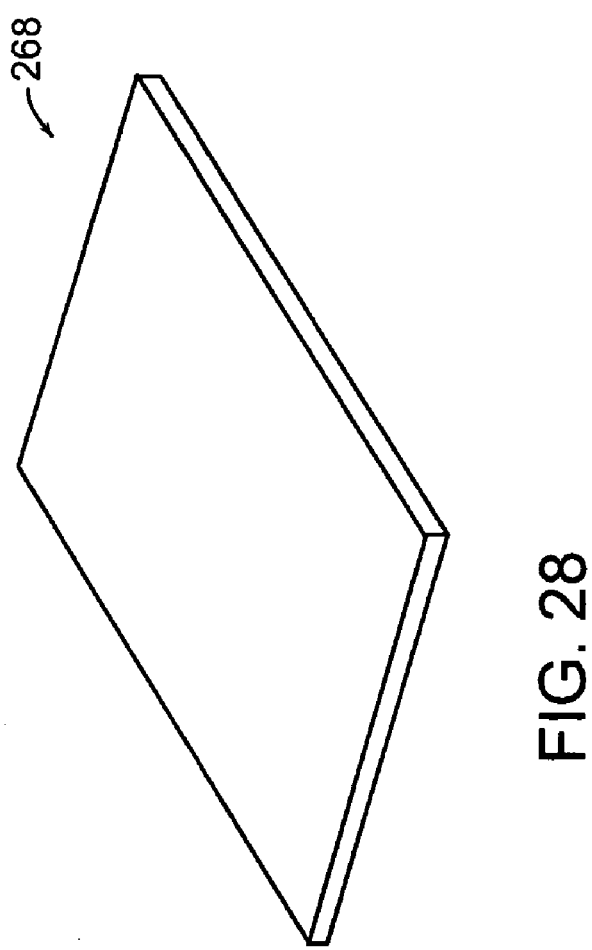
FIG. 28 is a perspective view of a preform sheet.

Referring to FIGS. 26–27, fastener product 237 includes two strips 238 of hook preform extending in the machine direction, molded in place on a non-woven backing 246. FIG. 27 is a cross-sectional view of fastener product 237 along section 6—6. A resin cover 250 with multiple apertures 254 is placed across the hook preform strips 238 and the non-woven backing 246 and secured to the non-woven backing 246 at convenient points 258 around the apertures, within which hooks of the hook preform strips 238 are exposed for engagement. Precut parting lines 266 are formed in a pattern to divide the strip into individual fastening tabs 262 (an example of which is shown with diagonal shading), which in the example shown include one engaging zone 266 per tab, and which can be removed from the strip and incorporated into an assembled product, for example, a diaper. In an embodiment, the non-woven backing is 6" wide, two 1" wide strips of hooks are molded to it, parting lines are precut to provide 2" fastening tabs, and the non-woven backing 246 and resin cover 250 are stretchable. The non-woven backing and cover may be non-stretchable if desired.

Figure 30:
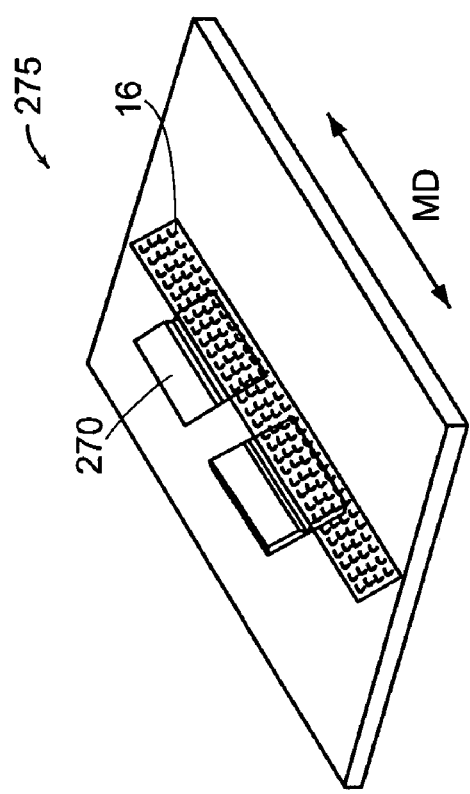
FIG. 30 shows the sheet of FIG. 29 with a plurality of molded elements.
Figure 31:
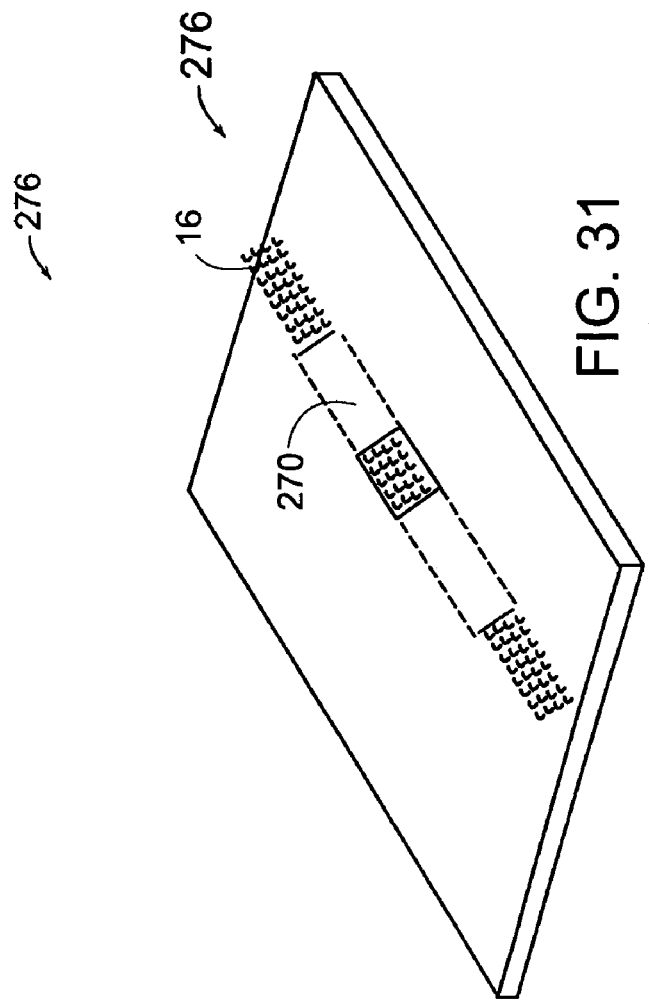
FIG. 31 shows the sheet of FIG. 30 with closed flaps covering extraneous areas.

FIGS. 28–31 sequentially illustrate the formation of another fastener product. Preform sheet 268 is first cut to produce a sheet 274 with flaps 270 and defining apertures 271. Flaps 270 may contain additional apertures (not shown). Preform sheet 268 can be woven or non-woven, porous or non-porous, for example. In some implementations, preform sheet 268 is a woven or non-woven, paper, film, or a clothlike sheet. A plurality of fastener elements 16 are molded onto sheet 274 in a longitudinal continuous band in the machine direction, forming a preform fastener product 275, as shown in FIG. 30. FIG. 31 illustrates covering of extraneous regions by closing flaps 270 and fixing the flaps to the surface of the fastener product, forming the final product 276. In some implementations, flaps 270 are fixed to 275 by temperature and pressure, adhesives, ultrasonics or by releasable engagement using loop material.

In other examples not illustrated, a backing sheet 13 may be bonded to a back surface of the final product 276. A covering strip 8, similar to that shown in FIG. 1, may be used and bonded at select locations by means discussed above.

Figure 32:
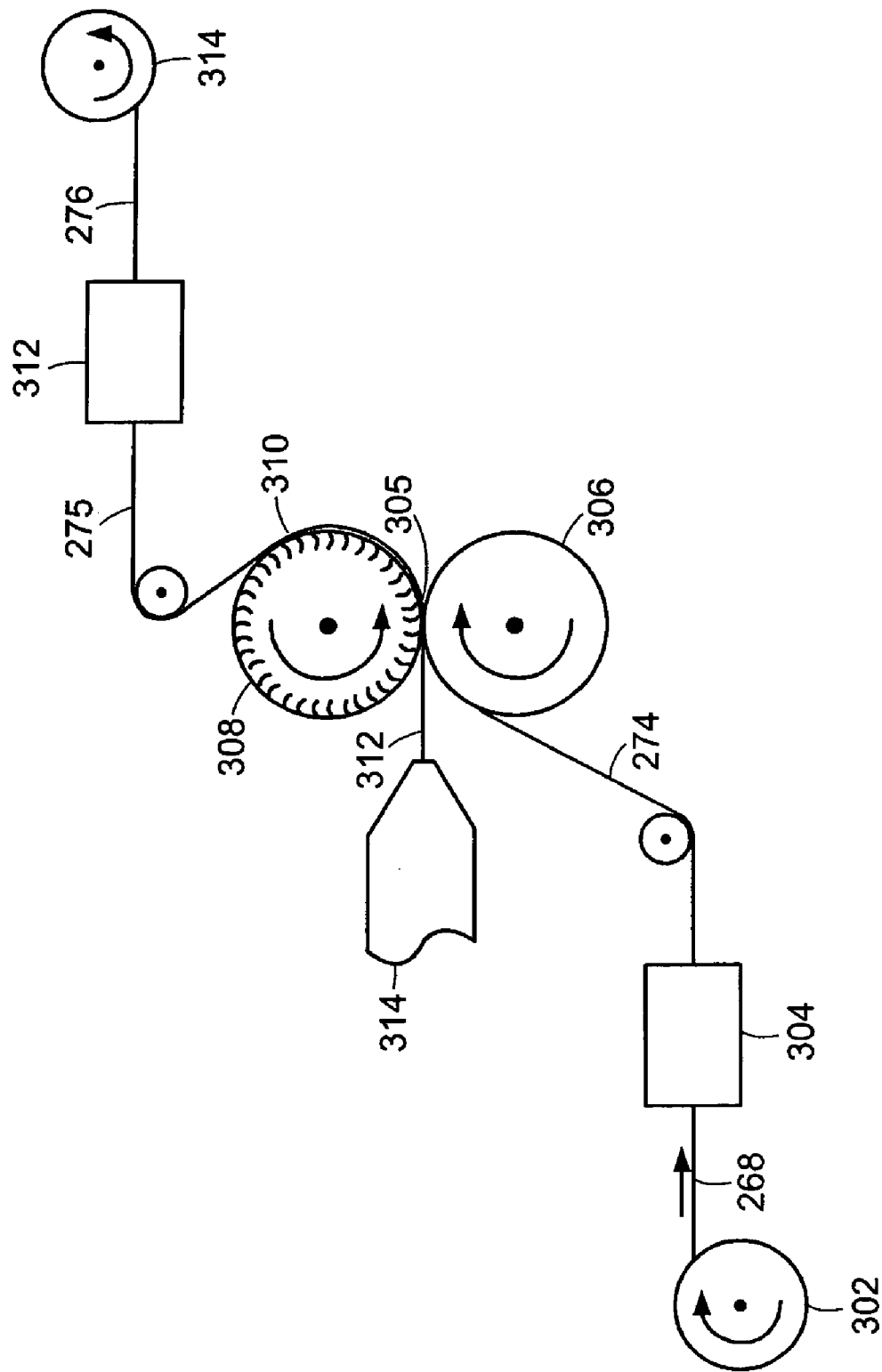
FIG. 32 illustrates a method of making the fastener product illustrated in FIG. 31. Like reference symbols in the various drawings indicate like elements.

Referring to FIG. 32, product fastener 276 may be prepared by dispensing preform sheet 268 from roll 302 and feeding it into an aperture/flap forming station 304. The apertured sheet 274 is then pulled through a nip 305 formed between roll pressure roll 306 and mold roll 308 (having a series of hook-forming cavities 310), together with molten resin 312 pumped from an extruder die 314. The preform product 275 is then fed to a flap closing station 312 where the flaps are folded back over the molded fastener elements. The finished product is then taken up on roll 314. In another forming method (not shown), only discrete fastener elements stems are molded in cavities 308, and the distal ends of the molded stems are deformed downstream to create loop engageable heads.

What is claimed is:

1. A method of manufacturing a fastener, comprising:
   forming a fastener product preform sheet comprising a sheet-form base and an array of hook-shaped fastener elements extending from a broad side of the base; and
   securing at least a portion of a cover sheet, to a corresponding portion of the sheet-form base across the array of fastener elements, the cover sheet defining an aperture therethrough having a lateral extent of less than about 0.625 mm, with fastener elements exposed for engagement in an engaging zone corresponding to the aperture of the cover sheet, and the engaging zone being surrounded by a contiguous covered preform region.

2. The method of claim 1, wherein securing the cover sheet includes covering fastener elements with the cover sheet in the covered preform region.

3. The method of claim 2, wherein securing the cover sheet includes releasably engaging the cover sheet with the fastener elements.

4. The method of claim 3, wherein engageable fibers of the cover sheet engage the fastener elements.

5. The method of claim 3, wherein a non-woven loop material of the cover sheet engages the fastener elements.

6. The method of claim 2, wherein the cover sheet comprises a resin film.

7. The method of claim 6, wherein securing the cover sheet includes ultrasonically welding the film to the sheet-form base.

8. The method of claim 6, wherein securing the cover sheet includes applying heat and pressure to weld the film to the sheet-form base.

9. The method of claim 6, wherein securing the cover sheet includes attaching the film to the sheet-form base using adhesive material.

10. The method of claim 6, wherein securing the cover sheet includes deforming and shortening the fastener elements in the covered preform region.

11. The method of claim 6, wherein fastener elements within the engaging zone protrude into the aperture of the secured cover sheet.

12. The method of claim 11, wherein securing the cover sheet includes permitting fastener elements within the engaging zone to protrude through the aperture.

13. The method of claim 1, wherein forming the fastener product preform includes molding the sheet-form base as a continuous strip.

14. The method of claim 13, wherein forming the fastener product preform includes integrally molding stems of the fastener elements with the sheet-form base.

15. The method of claim 14, wherein the fastener elements comprise engageable heads formed on each stem.

16. The method of claim 13, wherein forming the fastener product preform includes integrally molding hook-shaped fastener elements with the sheet-form base.

17. The method of claim 1, wherein the fastener elements comprise stems woven into the sheet-form base.

18. The method of claim 1, wherein the engaging zone is more engageable against a mating loop product than is the cover sheet.

19. The method of claim 1, further comprising securing a backing sheet to a broad side of the preform sheet opposite the broad side of the sheet-form base from which the fastener elements extend.

20. The method of claim 19, further comprising securing the backing sheet to the cover sheet.

21. The method of claim 19, wherein the backing sheet comprises a resin film.

22. The method of claim 1, further comprising passing the cover sheet through a cutting means to form the aperture.

23. The method of claim 1, wherein forming the sheet-form base further comprises cutting a pattern into the preform sheet and removing an extraneous region from the preform sheet according to the pattern.

24. The method of claim 23, wherein the extraneous region is a longitudinally continuous strip.

25. The method of claim 24, wherein the pattern is cut with a cutter selected from the group consisting of a laser cutter, a die cutter, and a cutting blade.

26. The method of claim 23 wherein removal of the extraneous region leaves behind a closed pattern perforation in the preform sheet.

27. The method of claim 1, wherein the cover sheet defines multiple apertures therethrough across the array of fastener elements, with fastener elements exposed for engagement in engaging zones corresponding to the apertures of the cover, and the engaging zones separated by the contiguous preform region.

28. A fastener product, comprising:
a preform having a sheet-form base and an array of fastener elements extending from one broad side of the base; and
a cover secured across the array of fastener elements, at least a portion of the cover being secured to a corresponding portion of the sheet-form base, the cover defining an aperture therethrough having a lateral extent of less than about 0.625 mm, with fastener elements exposed for engagement in an engaging zone corresponding to the aperture of the cover, and the engaging zone being surrounded by a contiguous covered preform region.

29. The fastener product of claim 28, wherein exposed fastener elements in the engaging zone protrude into the aperture of the cover.

30. The fastener product of claim 28, wherein exposed fastener elements in the engaging zone are disposed below the cover.

31. The fastener product of claim 28, wherein the aperture is sized to prevent a tip of an adult human finger from touching the fastener elements in the engaging zone when the fingertip contacts the cover at the aperture.

32. The fastener product of claim 28, wherein the cover is stretchable.

33. The fastener product of claim 32, wherein the fastener product further comprises a stretchable substrate upon which the preform is mounted.

34. The fastener product of claim 33, wherein a first said preform and a second said preform are both mounted to the stretchable substrate.

35. The fastener product of claim 34, wherein the first preform is separably attached to the second preform.

36. The fastener product of claim 28, wherein the sheet-form base of the preform is molded.

37. The fastener product of claim 28, wherein the fastener elements comprise stems integrally molded with the sheet-form base.

38. The fastener product of claim 37, wherein the fastener elements comprise engageable heads formed on each stem.

39. The fastener product of claim 37, wherein the fastener elements are hook-shaped.

40. The fastener product of claim 28, wherein the engaging zone is more engageable against a mating loop product than is the cover.

41. The fastener product of claim 28, wherein the fastener elements comprise stems woven into the sheet-form base.

42. The fastener product of claim 28, wherein an edge of the cover extends beyond the sheet-form base of the preform.

43. The fastener product of claim 28, wherein an edge of the cover extends to an edge of the sheet-form base.

44. The fastener product of claim 28, wherein an edge of the sheet form base extends beyond the cover.

45. A method of manufacturing a fastener product, the method comprising:
forming a plurality of apertures with corresponding flaps in a preform sheet, each of the apertures having a lateral extent of less than about 0.625 mm;
folding back the flaps to expose the apertures;
applying molten resin to the preform sheet with apertures, the molten resin bonding to the preform sheet and at least partially overlapping the apertures and forming on the exposed resin surface an array of discrete fastener elements with stems integrally molded with and extending from the resin surface; and
folding the flaps over the fastener elements disposed in the apertures to form a cover secured across selected regions of fastener elements, with fastener element exposed for engagement in engaging zones corresponding to the apertures in the preform sheet and the engaging zones being surrounded by a continuous covered preform region.

46. The method of claim 45 wherein the preform sheet comprises a thermoplastic.

47. The method of claim 45 wherein the preform sheet comprises an elastomer.

48. The method of claim 45 wherein the preform sheet comprises a nonwoven fabric.

49. The method of claim 45 wherein the steps of forming the apertures, folding back the flaps, applying molten resin, forming an array of discrete fastener elements and folding the flaps over the fastener elements disposed in the apertures are performed continuously.

50. The method of claim 45, further comprising securing the flaps over the fastener elements by applying heat.

51. The method of claim 45, further comprising securing the flaps over the fastener elements with adhesive.

52. The method of claim 45, further comprising securing the flaps over the fastener elements by ultrasonic welding.

53. The method of claim 45 wherein forming the fastener elements includes molding the fastener elements integrally with the resin surface.

54. The method of claim 45 wherein forming the fastener elements includes molding discrete stems and then deforming distal ends of the stems to form engageable heads on the stems.

55. The method of claim 45 wherein the resin surface is longitudinally continuous.

56. The method of claim 45, further comprising releasably securing the flaps over the fastener elements.

57. The fastener product of claim 28, wherein the cover sheet is constructed to releasably engage fastener elements in the covered preform region.

58. The fastener product of claim 57, wherein engageable fibers of the cover sheet engage the fastener elements.

59. The fastener product of claim 57, wherein a nonwoven loop material of the cover sheet engages the fastener elements.

60. The fastener product of claim 28, wherein the cover sheet comprises a resin film.

61. The fastener product of claim 60, wherein the resin film is welded to the sheet-form base.

62. The fastener product of claim 28, wherein the cover sheet is bonded to the sheet-form base using adhesive material.

63. The fastener product of claim 28, wherein fastener elements in the covered preform region are bonded to the cover sheet to secure the cover sheet to the preform base.

64. A fastener product, comprising:
   a preform having a sheet-form base and an array of fastener elements extending from one broad side of the base; and
   a cover secured across the array of fastener elements, at least a portion of the cover being secured to a corresponding portion of the sheet-form base, the cover defining flaps that are each movable between a first, closed position, and a second, open position, the flaps defining, in their open positions, an array of apertures, with fastener elements exposed for engagement in an array of engaging zones corresponding to the apertures, the engaging zones being surrounded by a contiguous covered preform region.

* * * * *